(12) United States Patent
James et al.

(10) Patent No.: US 8,813,874 B2
(45) Date of Patent: Aug. 26, 2014

(54) METHOD FOR SERVICING SUBTERRANEAN WELLS

(75) Inventors: Simon Gareth James, Le Plessis-Robinson (FR); Michel Michaux, Verrieres-le-Buisson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 250 days.

(21) Appl. No.: 13/390,935

(22) PCT Filed: Aug. 12, 2010

(86) PCT No.: PCT/EP2010/005210
§ 371 (c)(1),
(2), (4) Date: Mar. 14, 2012

(87) PCT Pub. No.: WO2011/023379
PCT Pub. Date: Mar. 3, 2011

(65) Prior Publication Data
US 2012/0175119 A1     Jul. 12, 2012

(30) Foreign Application Priority Data
Aug. 28, 2009   (EP) .................................... 09290657

(51) Int. Cl.
*E21B 43/22*      (2006.01)
*C09K 8/02*       (2006.01)
*C09K 8/50*       (2006.01)
*C09K 8/508*      (2006.01)

(52) U.S. Cl.
CPC .. *C09K 8/50* (2013.01); *C09K 8/508* (2013.01)
USPC ................................ 175/72; 175/64; 166/300

(58) Field of Classification Search
None
See application file for complete search history.

(56) References Cited

U.S. PATENT DOCUMENTS

| | | |
|---|---|---|
| 3,657,175 A | 4/1972 | Zimmerman et al. |
| 3,851,200 A | 11/1974 | Thomasson |
| 3,851,479 A | 12/1974 | Argabright et al. |
| 3,852,100 A | 12/1974 | Argabright et al. |
| 4,301,016 A | 11/1981 | Carriere et al. |
| 4,384,096 A | 5/1983 | Sonnabend |
| 4,480,693 A | 11/1984 | Newlove et al. |
| 4,486,316 A | 12/1984 | Carriere et al. |
| 4,600,761 A | 7/1986 | Ruffner et al. |
| 4,626,285 A | 12/1986 | Peiffer et al. |
| 4,630,678 A | 12/1986 | Mumallah et al. |
| 4,659,750 A | 4/1987 | Sedillo et al. |
| 4,683,952 A | 8/1987 | Peiffer et al. |
| 4,933,031 A | 6/1990 | Blomberg et al. |
| 4,935,060 A | 6/1990 | Dingsoyr |
| 6,189,615 B1 | 2/2001 | Sydansk |
| 2006/0122071 A1 | 6/2006 | Reddy et al. |

FOREIGN PATENT DOCUMENTS

| | | |
|---|---|---|
| EP | 0217485 | 7/1991 |
| EP | 2071003 | 6/2009 |
| WO | 2009/074758 | 6/2009 |

OTHER PUBLICATIONS

Daccord G, Craster B, Ladva H, Jones TGJ and Manescu G: "Cement-Formation Interactions," in Nelson EB and Guillot D (eds.): Well Cementing-2nd Edition, Houston: Schlumberger (2006): 202-219.

*Primary Examiner* — Zakiya W Bates
(74) *Attorney, Agent, or Firm* — Michael Dae

(57) ABSTRACT

Methods for sealing voids and cracks in subterranean-formation rock that contains carbonate minerals, thereby minimizing or stopping fluid flow between the formation rock and the wellbore of a subterranean well, comprise pumping a solution of one or more lattices that contains at least one carboxylated monomer down a well during drilling and allowing it to enter voids (e.g., pores, fractures, vugs and caverns) in the carbonate-containing formation. The solution reacts with divalent cations liberated by the carbonates and forms a plug.

20 Claims, 2 Drawing Sheets

METHOD FOR SERVICING SUBTERRANEAN WELLS

BACKGROUND OF THE INVENTION

The statements in this section merely provide background information related to the present disclosure and may not constitute prior art.

This invention relates to methods for servicing subterranean wells, in particular, fluid compositions and methods for operations during which the fluid compositions are pumped into a wellbore, make contact with subterranean formations that comprise carbonate rocks, react with the rock surfaces and form a gel that seals voids and cracks.

During construction of a subterranean well, drilling and cementing operations are performed that involve circulating fluids in and out of the well. The fluids exert hydrostatic and pumping pressure against the subterranean rock formations, and may induce a condition known as lost circulation. Lost circulation is the total or partial loss of drilling fluids or cement slurries into highly permeable zones, cavernous formations and fractures or voids. Such openings may be naturally occurring or induced by pressure exerted during pumping operations. Lost circulation should not be confused with fluid loss, which is a filtration process wherein the liquid phase of a drilling fluid or cement slurry escapes into the formation, leaving the solid components behind.

Lost circulation can be an expensive and time consuming problem. During drilling, this loss may vary from a gradual lowering of the mud level in the pits to a complete loss of returns. Lost circulation may also pose a safety hazard, leading to well-control problems and environmental incidents. During cementing, lost circulation may severely compromise the quality of the cement job, reducing annular coverage, leaving casing exposed to corrosive downhole fluids, and failing to provide adequate zonal isolation. Lost circulation may also be a problem encountered during well-completion and workover operations, potentially causing formation damage, lost reserves and even loss of the well.

Lost-circulation solutions may be classified into three principal categories: bridging agents, surface-mixed systems and downhole-mixed systems. Bridging agents, also known as lost-circulation materials (LCMs), are solids of various sizes and shapes (e.g., granular, lamellar, fibrous and mixtures thereof). They are generally chosen according to the size of the voids or cracks in the subterranean formation (if known) and, as fluid escapes into the formation, congregate and form a barrier that minimizes or stops further flow.

Surface-mixed systems are generally fluids composed of a hydraulic cement slurry or a polymer solution that enters voids in the subterranean formation, sets or thickens, thus forming a seal that minimizes or stops further flow. Downhole-mixed systems generally consist of two or more fluids that, upon making contact in the wellbore or the lost-circulation zone, form a viscous plug or a precipitate that seals the zone. A thorough overview of LCMs, surface-mixed systems and downhole-mixed systems is presented in the following reference: Daccord G, Craster B, Ladva H, Jones T G J and Manescu G: "Cement-Formation Interactions," in Nelson E B and Guillot D (eds.): *Well Cementing*—$2^{nd}$ Edition, Houston: Schlumberger (2006): 202-219.

Downhole-mixed systems may suffer from various drawbacks, largely arising from limited direct control of the manner by which the two fluids commingle in the well. Operators may encounter difficulties sealing a particular zone or treating long intervals.

U.S. Pat. No. 6,189,615 relates to the reduction of permeability or fluid mobility within a carbonate-containing treatment region in a well bore. The process is initiated by preparing a gelation solution at the earthen surface which includes an acrylamide polymer, a crosslinking agent (chromium III), a stabilizing agent and an aqueous solvent. The gelation solution is injected into the well bore and displaced into the treatment region where it is gelled in situ to form a gel which substantially reduces the permeability of or fluid mobility within the treatment region. The presence of a cross-linker in the solution may cause premature gelation.

U.S. Pat. No. 4,630,678 discloses a water permeability contrast correction process to improve the sweep efficiency of waterflooding in carbonate-bearing strata which involves a sequential injection of (1) an optional aqueous preflush slug to adjust connate water salinity, (2) a slug of aqueous polymer gelable with polyvalent metal cations, such as an polyacrylamide, (3) an acidic aqueous solution effective to dissolve some of the carbonate and at least therefrom polyvalent metal cations specifically calcium or magnesium or both effective to gel said polymer, wherein said aqueous polymer and acidic solution can be injected together in a single slug, followed by (4) an additional aqueous polymer solution injection, wherein the acidic solution provides polyvalent metal cations in-situ for gelation of said polymer slug to preferentially decrease water permeability in highly permeable thief zones, and (5) an aqueous drive fluid.

US Patent Application 2006/0122071 teaches a two-fluid system comprising an alkali swellable latex and a pH-increasing material. When the latex fluid commingles with the other fluid containing the pH-increasing material, raising the pH to levels between about 7 to about 14, a gel forms that acts as a seal.

WO 2009/074658 is similar to U.S. 2006/0122071 except that it involves pH lowering additives in order to delay the swelling reaction. The lowered pH is from about 4 to about 7. Basically, when the pH downhole increases to alkaline values, the alkali swellable latex forms a gel acting as a seal.

As apparent, there is still a need for a composition that will solve the problem at pH lower than 7, and ideally the solution would be "a one-fluid system" that does not rely upon fluid mixing to achieve sealing and that do not need the presence of a cross-linking agent to avoid premature reaction.

SUMMARY OF THE INVENTION

The present invention fulfills these needs by providing a "one-component system" that does not need to be mixed downhole and that upon entering a lost-circulation zone interacts with the formation, thus forming a seal, even at pH below 7.

The present invention provides means to seal voids and cracks in subterranean-formation rock that contains carbonate minerals, thereby minimizing or stopping fluid flow between the formation rock and the wellbore of a subterranean well.

Embodiments of the invention disclose methods of treating a subterranean well with the aim of sealing voids in formations that contain carbonate minerals. The methods comprise pumping a treatment fluid of one or more polymers that contain at least one carboxylated monomer down a well and allowing it to enter voids (e.g., pores, fractures, vugs and caverns) in the carbonate-containing formation, whereupon it reacts with divalent cations liberated by the carbonates and forms a plug. The divalent cations bridge between the acid groups in the polymer to provide a significant viscosity increase. The plug seals the voids, minimizing or stopping further fluid flow between the carbonate-containing formation and the wellbore. The treatment fluid suitable according to the present invention can be solutions of lattices, polymer-emulsions or water-soluble carboxylated polymers and mixtures thereof. Said inventive method may be employed not only during well construction operations (e.g., drilling and cementing), but also during remedial operations that require the sealing of zones (e.g., conformance-control treatments). It is noticeable that the reaction between the polymer and the carbonate mineral and attached cations does not require the presence of a crosslinking agent, actually the reaction is triggered by the cations per se when contacting the polymer.

The carboxylate-acid containing polymer may be present in the range of from about 5% to about 50% by weight of the total treatment fluid. Typical examples of carboxylated polymers are hydrophobically modified alkali-swellable emulsions (HASE).

Plug formation may be further supported by adding a pH-reducing agent to the treatment fluid such that the pH of the solution is less than or equal to 7, preferably less than 7, more preferably less than 5. When the acidified treatment fluid contacts carbonate minerals, a dissolution occurs that releases divalent cations such as $Ca^{2+}$ and $Mg^{2+}$. The increased concentration of divalent cations accelerates the increase of viscosity and promotes the formation of stronger plugs. It has to be noted that trivalent ion such as $FE3+$ may also cause plug formation if present in the formation.

The treatment fluid may be pumped down tubulars (e.g., drill pipe, coiled tubing and casing) or down the tubular/wellbore annulus. A spacer fluid may also be pumped ahead to separate the treatment fluid from other wellbore fluids, preventing premature gelation and/or plugging.

In a further aspect, embodiments of the invention aim at methods of controlling lost circulation in a subterranean well. Similar to the previous aspect, the invention is designed to address lost-circulation originating from formations containing carbonate minerals. The methods comprise pumping a treatment fluid that contain at least one carboxylated monomer down a well and allowing it to enter voids (e.g., pores, fractures, vugs and caverns) in the carbonate-containing formation, whereupon it reacts with divalent cations liberated by the carbonates and forms a plug. The divalent cations bridge between the acid groups in the polymer to provide a significant viscosity increase. The plug seals the voids, minimizing or stopping further fluid flow between the carbonate-containing formation and the wellbore. Solutions of lattices, polymer-emulsions or water-soluble carboxylated polymers can be used to perform the method The carboxylate-acid containing polymer may be present in the range of from about 5% to about 50% by weight of the total treatment fluid. Typical examples of carboxylated polymers are hydrophobically modified alkali-swellable emulsions.

Plug formation may be further supported by adding a pH-reducing agent to the treatment fluid such that the pH of the solution is less than or equal to 7. When the acidified treatment fluid contacts carbonate minerals, a dissolution occurs that releases divalent cations such as $Ca^{2+}$ and $Mg^{2+}$. The increased concentration of divalent cations accelerates the increase of viscosity and promotes the formation of stronger plugs.

The treatment fluid may be pumped down tubulars (e.g., drill pipe, coiled tubing and casing) or down the tubular/wellbore annulus. A spacer fluid may also be pumped ahead to separate the treatment fluid from other wellbore fluids, preventing premature gelation and/or plugging.

To aid lost-circulation control, the treatment fluid may also contain one or more lost-circulation materials, including granular particles, lamellar particles and fibers.

The treatment fluid according to the embodiments as described herein preferably do not contain any crosslinking agent and especially no chromium ions as presence of crosslinking agent in the treatment fluid may cause premature reaction and thus operational problems. Furthermore, crosslinking agents such as chromium ions may have detrimental effects on the environment.

DETAILED DESCRIPTION

Figure 1:
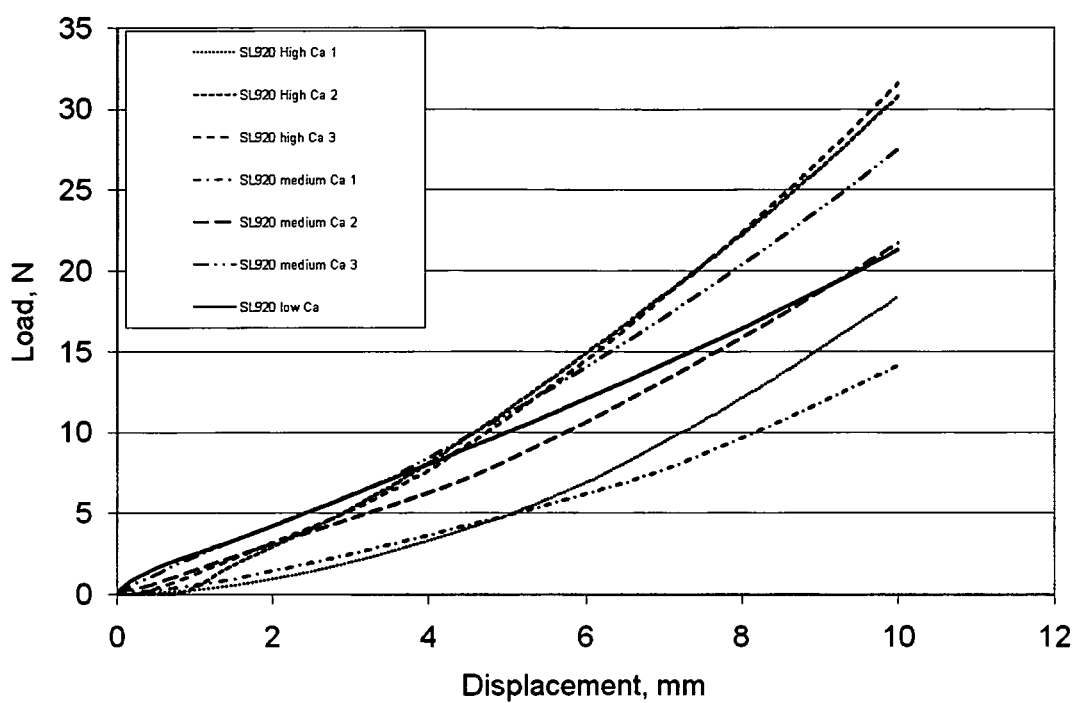
FIG. 1 shows the results of gel-penetration tests performed with mixtures of a hydrophobically modified alkali swellable emulsion (ALCOGUM™ SL920) and three different concentrations of calcium ions.
Figure 2:
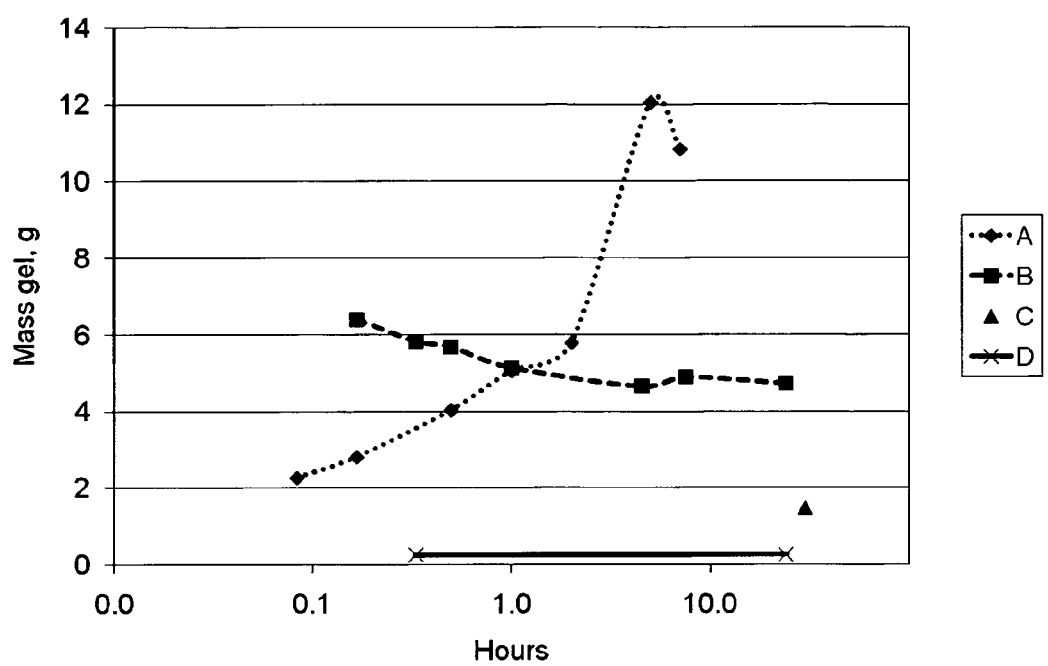
FIG. 2 shows the results of experiments to measure the rate of reaction of an HASE (ALCOGUM™ SL920) with carbonate rock.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The inventors have surprisingly found that treatment fluids comprising at least one monomer containing carboxylic acid groups will form a plug when placed in contact with carbonate minerals such as chalk and dolomite.

By treatment fluid, it has to be understood in the context of the present invention a solution of lattices, polymer-emulsions or water-soluble carboxylated polymers. Said fluid shall comprise at least one polymer with at least one carboxylated monomer. In fact, without wishing to be bound by any theory, the inventors noticed that lattices and/or polymer emulsions are ways to inject high polymer concentrations that would not be pumpable in other forms. Solutions of carboxylated polymers, with sufficient molecular weight for the application, have a viscosity that is so high that an injection at sufficient concentration (in order to, later, after reaction with cations, form a plug) is not possible. With the present lattices or polymer emulsions this barrier is not present anymore. In a preferred embodiment, the polymer solution contains from 5 to 50 wt % of carboxylate-acid polymer, preferably from 20 to 50 wt %. In a further preferred embodiment, the polymer has a molecular weight of more than 200 kDa. In an even further preferred embodiment, the polymer contains at least 5 wt % of carboxylated monomers, more preferably more than 20 wt % and even more preferably more than 40 wt %. When these lattices or polymer emulsions are activated by the calcium ions a very strong plug and/or seal can be formed.

Suitable polymer emulsions can be found for example in EP 217485, U.S. Pat. No. 4,600,761, U.S. Pat. No. 3,657,175, U.S. Pat. No. 4,384,096. Basically, the polymer shall not be degraded by acidic pH and preferably have a molecular weight of more than 40 kDa and preferably more than 200 kDa. The emulsions typically have water as the continuous phase but may also be formulated as water in oil emulsions. The emulsions may be stabilized by surfactants or by grafting polymers such as starch onto the polymer chains.

By plug, it has to be understood in the context of the present invention that the viscosity of the treatment fluid is increased by reaction with the cation. Without wishing to be bound by any theory, the inventors believe that the polymer contained in the injected fluid is "activated" by e.g. the calcium ions forming a solid mass that may be considered as agglomerate or flocculate of polymer and more generally as a gel. In the rest of the description, the terms plug, seal and/or gel will be used indifferently.

It has to be noted that when water-soluble carboxylated polymers are used in the treatment, the polymer concentration is usually lower than what can be achieved with lattices or polymer emulsions and thus the plugs formed are typically weaker. In a preferred embodiment the treatment fluid is a solution of lattices or a polymer-emulsion, in an even more preferred embodiment, the treatment fluid is a solution of lattices.

Carbonate minerals contain divalent cations such as $Ca^{2+}$ and $Mg^{2+}$. Accordingly, the divalent cations bridge between the acid groups in the latex, resulting in a significant viscosity increase. The viscosity increase process is enhanced when the latex contains a pH-reducing material, lowering the latex-fluid pH to a level below 7. The low-pH solution partially reacts with the carbonate minerals, causing the release of more divalent cations. As a result, the gelation process is accelerated and the gel strength increases.

The concentration of carboxylic acid monomers in the treatment fluid may vary between about 5% to about 60% by weight of the total monomer composition used in preparing the fluid more preferably from 15% to 60%. Without limitation, examples of such carboxylic acid containing groups include acrylic acid, alkyl acrylic acids, such as methacrylic acid and ethacrylic acid, alpha-chloro-acrylic acid, alpha-cyano acrylic acid, alpha-chloro-methacrylic acid, alpha-cyano methacrylic acid, crotonic acid, alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, or combinations thereof. In an embodiment, the carboxylic acid containing groups can include itaconic acid, acrylic acid, and combinations thereof. Preferably the carboxylic acid is chosen from the group constituted by acrylic acid, methacrylic acid, maleic acid, itaconic acid and fumaric acid Typical examples of carboxylated lattices are alkali swellable lattices. Without limitation, examples of suitable commercially available alkali swellable lattices include TYCHEM™ 68710-00 of Dow Reichold Speciality Latex LLC; ACRYSOL™ TT-615 ACRYSOL™ RM-895 and ACRYSOL™ ASE-1000 of Rohm and Haas (subsidiary of Dow Chemical); SN THICKENERS™ 920, 922, 924, 634 and 636 of San Napco Limited, Sanyo Chemical Industry, Japan; ALCOGUM™ L255, SL-117, SL920 of Alco Chemical, an AkzoNobelCompany; EKA™ VC-9052 of Eka Chemicals, an AkzoNobel company; RHEOVIS™ 112, 132 and 152 and VISCALEX™ HV30 of Ciba (part of BASF); LATEKOLL™ D from BASF.

These latex formulations have utility as sealant formulations in the context of subterranean wells. Formations composed of carbonate minerals are frequently traversed during the drilling process. Such formations may be problematic if they contain voids that allow drilling fluid to enter and escape the wellbore—a condition known as lost circulation. Carbonate formations may also produce fluids such as oil, gas and water. Under certain circumstances, it may be desirable to control the ingress of these fluids into the wellbore.

One method of the present invention discloses a method of treating a subterranean well with the aim of sealing voids in formations that contain carbonate minerals. The method comprises pumping a treatment fluid of one or more lattices or polymer-emulsions that contain at least one carboxylated monomer down a well and allowing it to enter voids (e.g., pores, fractures, vugs and caverns) in the carbonate-containing formation, whereupon it reacts with divalent cations liberated by the carbonates and forms a plug. The treatment fluid may also contain a pH reducing agent such that the pH of the treatment fluid is less than or equal to 7. This method may be employed not only during well construction operations (e.g., drilling and cementing), but also during remedial operations that require the sealing of zones (e.g., conformance-control treatments).

The treatment fluid may be pumped down tubulars (e.g., drill pipe, coiled tubing and casing) or down the tubular/wellbore annulus. A spacer fluid may also be pumped ahead to separate the treatment fluid from other wellbore fluids, preventing premature plugging. Without limitation, the treatment fluid may also be delivered via downhole tools such as a dump bailer of the Cased Hole Dynamics Tester (CHDT), available from Schlumberger.

Another method of the present invention aims to control lost circulation during the construction of a subterranean well. Similar to the previous method, the invention is designed to address lost-circulation originating from formations containing carbonate minerals. The method comprises pumping a treatment fluid of one or more polymers that contain at least one carboxylated monomer down a well and allowing it to enter voids (e.g., pores, fractures, vugs and caverns) in the carbonate-containing formation, whereupon it reacts with divalent cations liberated by the carbonates and forms a gel. The gel seals the voids, minimizing or stopping further fluid flow between the carbonate-containing formation and the wellbore. The treatment fluid may also contain a pH reducing agent such that the pH of the fluid is less than or equal to 7.

The treatment fluid may be pumped either down tubulars (e.g., drill pipe, coiled tubing and casing) or down the tubular/wellbore annulus. A spacer fluid may also be pumped ahead to separate the treatment fluid from other wellbore fluids, preventing premature gelation.

To aid lost-circulation control, the treatment fluid may also contain one or more lost-circulation materials, including granular particles, lamellar particles and fibers.

EXAMPLES

The following examples serve to further illustrate the invention.

Example 1

A solution of calcium chloride was made containing 10 g of $CaCl_2$ in 15 g of distilled water. The solution had a pH of 7. 1 mL of this solution was added to 20 mL of ALCOGUM™ SL920 (a HASE from AkzoNobel) and also to 1 mL of D600G (a styrene-butadiene latex available from Schlumberger). The ALCOGUM™ SL920 formed a strong gel immediately upon mixing with the calcium chloride solution. No gel was formed when the calcium chloride solution was mixed with D600G.

Example 2

Three solutions were made containing different concentrations of calcium chloride:
a. 10 g $CaCl_2$ in 15 g distilled water (40% by weight—high Ca content)
b. 5 g $CaCl_2$ in 15 g distilled water (25% by weight—medium Ca content)
c. 2 g $CaCl_2$ in 18 g distilled water (10% by weight—low Ca content)

3.75 g of these solutions were added to 75 mL of ALCOGUM™ SL920 while stirring gently and then left overnight. The strength of the gel was determined by pushing a cylindrical probe (1cm in diameter) into the gel at a rate of 0.1 mm/s and measuring the force exerted on the probe. FIG. 1 is a graph that shows the results. Several tests were performed without moving the sample as the surface of the samples was uneven, particularly at the medium and high concentrations of calcium chloride. It can be seen from the graph that increasing the calcium concentration increases the force required to penetrate the gel. Increasing calcium ion concentration also caused an increase in syneresis. The amount of syneresis was estimated by measuring the weight of the consolidated gel and comparing it to the mass of all the components initially mixed (78.75 g). The results are shown in Table 1.

TABLE 1

Syneresis measurements from various mixtures of ALCOGUM ™ SL920 latex and calcium chloride.

| $CaCl_2$ | Mass initial | Mass gel | Syneresis |
| --- | --- | --- | --- |
| 5% of 40% | 78.75 g | 39.7 g | 39.0 g |
| 5% of 25% | 78.75 g | 40.1 g | 38.6 g |
| 5% of 10% | 78.75 g | 47.6 g | 31.1 g |

Example 3

A solution of calcium chloride was made containing 10 g of $CaCl_2$ in 15 g of distilled water. The solution had a pH of 7. 1 mL of 1% HCl was added to 19 mL of ALCOGUM™ SL 920. A small drop of methyl red pH indicator was added to this mixture and the solution turned a pink color indicating a pH lower than 4.4 (methyl red changes from a red to a yellow color as the pH increases from 4.4 to 6.2). 1 mL of the calcium chloride solution was added to 20 mL of ALCOGUM™ SL920. The ALCOGUM™ SL920 formed a strong gel immediately upon mixing with the calcium chloride solution. The gel remained a pink color, indicating that the pH of the solution remained below 4.4. This demonstrates that a hydrophobically modified alkali swellable latex can gel in the presence of calcium ions at an acidic pH.

Example 4

A sample of chalk rock formation from a shallow depth was used in these tests as was a sample of Hollington sandstone. The chalk formation is mostly composed of calcium carbonate while the Hollington sandstone is mostly quartz. Small samples of both rocks were taken and saturated in distilled water for at least 24 hours prior to testing to ensure that the samples were filled with water. The pH of the water in contact with the chalk was measured to be equal to 7. Small samples of both rocks were placed in contact with either ALCOGUM™ SL920 or D600G. The results are shown in Table 2. The carboxylate containing emulsion (AL-COGUM™ SL920) reacted with the chalk formation to form a strong gel but not with the sandstone.

TABLE 2

Behavior of latices placed in contact with chalk and sandstone.

| | Chalk | | Hollington sandstone | |
| --- | --- | --- | --- | --- |
| | D600G | ALCOGUM ™ SL920 | D600G | Alcogum SL920 |
| 24 hours | No gel | Partially gelled | No gel | No gel |
| 7 days | No gel | Completely gelled | No gel | No gel |

Example 5

Tests were performed to examine the rate of reaction of ALCOGUM™ SL920 with carbonate rock as a function of temperature and concentration of acid. The experimental method was as follows. Small pieces of the chalk rock, saturated in distilled water, were broken from the large sample and weighed. Similar sized rock pieces were chosen for the test to provide similar surface area for reaction in each case. These samples were then placed in solutions of the test fluids and stored at different temperatures. At various time intervals the rock samples were carefully removed from the containers and weighed. As the latex solutions gelled, more of the latex stuck to the rock sample. The increase in weight with time for a given sample gives an indication of the rate of reaction. The tests performed are shown below.

A. ALCOGUM™ SL920 with HCl (3 mL of 1% HCL to 17 mL latex) (rock weight=12.5 g)
B. ALCOGUM™ SL920 with HCl (3 mL of 1% HCL to 17 mL latex) at 60° C. (rock weight=11.3 g)
C. ALCOGUM™ SL920 at room temperature (rock weight=12.9 g)
D. D600G with HCl (3 mL of 1% HCL to 17 mL latex) at room temperature (rock weight=15 g)

The results of the tests are shown in FIG. 3. Several observations may be made.

The styrene-butadiene latex (D600G) does not gel in the presence of the rock as evidenced by virtually no weight gain over 24 hours. The slight weight gain is due to a thin layer of liquid latex on the rock.

The HASE (ALCOGUM™ SL920) alone reacts slowly with the rock at room temperature

The HASE reacts more quickly at room temperature in the presence of acid.

The HASE reacts more quickly at high temperature than at low temperature.

In tests A and B the decrease in weight with time is due to syneresis of the gel formed around the rock. As the gel exhibits syneresis it becomes more rigid.

Example 6

The procedure of example 1 was used to test several raw materials.

A solution of calcium chloride was made containing 10 g of $CaCl_2$ in 15 g of distilled water. The solution had a pH of 7. 1 mL of 1% HCl was added to 19 mL of various emulsions and lattices:

TABLE 3 description of polymer emulsions and latices used.

| Product | Supplier | Description of the product (from the supplier) |
|---|---|---|
| STEROCOLL ™ FS | BASF | Aqueous dispersion of an acrylic polymer |
| ALCOGUM ™ L255 | AkzoNobel | Hydrophobically modified alkali-swellable emulsion |
| ALCOGUM ™ SL289 | AkzoNobel | Hydrophobically modified alkali-swellable emulsion |
| ALCOGUM ™ SL117 | AkzoNobel | Hydrophobically modified alkali-swellable emulsion |
| LATEKOLL ™ D | BASF | Alkaline-swelling acrylate thickener |
| LATEKOLL ™ DS | BASF | Alkaline-swelling acrylate thickener |
| TYCHEM ™ 68710-00 | Dow Chemical | Carboxylated Styrene-butadiene polymer. (latex) |
| PLIOTEC ™ PA20 | Eliokem | Acrylic latex |
| PLIOTEC ™ EL25 | Eliokem | Elastomeric acrylic latex |
| VISCALEX ™ HV30 | BASF | Alkali-swellable emulsion |

The solutions were left overnight and examined to visually determine the state of the acidified solutions. At this stage the precipitate that was observed in a few samples appeared to be small lumps of flocculated polymer. Then 1 mL of the calcium chloride solution was added to the polymer solutions with mild stirring and then left static overnight. In cases where a solid mass was formed the mass percentage of liquid remaining was determined by measuring the mass of the entire sample and then decanting off the liquid and measuring the mass of the liquid. The amount of liquid remaining for any sample increased with time—this was syneresis and the liquid expelled was clear except for the Pliotec samples (appeared to be the original latex) and the ALCOGUM™ SL117 (liquid was slightly yellow but significantly different from the original product). The results are shown in the table below:

TABLE 4

Behavior of polymer emulsions and latices used.

| Product | Effect of acid | Effect of calcium chloride | |
|---|---|---|---|
| STEROCOLL ™ FS | No change | Liquid | 100% Liquid |
| ALCOGUM ™ L255 | No change | Solid mass | 13.6% Liquid |
| ALCOGUM ™ SL289 | Precipitate | Solid mass | 20.2% Liquid |
| ALCOGUM ™ SL117 | Precipitate | Solid mass | 41.8% Liquid |
| LATEKOLL ™ D | No change | Solid mass | 47.3% Liquid |
| LATEKOLL ™ DS | No change | Solid mass | 6.6% Liquid |

TABLE 4-continued

Behavior of polymer emulsions and latices used.

| Product | Effect of acid | Effect of calcium chloride | |
|---|---|---|---|
| TYCHEM ™ 68710-00 | No change | Solid mass | 1.2% Liquid |
| PLIOTEC ™ PA20 | Slight precipitate | No change | 100% Liquid |
| PLIOTEC ™ EL25 | Significant precipitate | No change | 86.5% Liquid |
| VISCALEX ™ HV30 | Slight precipitate | Solid mass | 35% Liquid |

The STEROCOLL™ FS did not react as the polymer requires alkali for dissolving and thus is not suitable for this application. The acrylic latex products from Eliokem were not suitable as they were affected by the addition of acid. The ALCOGUM™ SL products were partially affected by the acid but still produced a solid mass when calcium was added.

Example 7

Two solutions of sodium polyacrylate (6000 MW) were made one containing 20% weight sodium polyacrylate and the other 30%. The viscosity of the two solutions was higher than the solutions from example 6. 1 mL of 1% HCl was added to 19 mL of each of the sodium polyacrylate solutions while stirring. Subsequently 1 mL of the calcium chloride solution was added to the acidified sodium polyacrylate solutions. In all cases a gel/precipitate was formed with the addition of calcium chloride but the gel dissolved after a few minutes.

We claim:

1. A method of treating a subterranean well, comprising the following steps:
   i. pumping a treatment fluid comprising from 5 wt % to 60 wt % of at least one polymer containing at least one carboxylate functional group down the well during drilling;
   ii. allowing the treatment fluid to enter voids in a subterranean formation containing carbonate minerals; and
   iii. reacting the treatment fluid with the carbonate minerals and associated divalent cations, thereby forming a plug, characterized in that the reaction to form the plug does not require the presence of a crosslinking agent.

2. The method of claim 1, wherein the treatment fluid is pumped into the well through the interior of one or more tubulars chosen from the group consisting of drill pipe, coiled tubing and casing.

3. The method of claim 2, wherein the treatment fluid is pumped into the well through an annulus between the tubulars and the subterranean formation.

4. The method of claim 1, wherein the treatment fluid further comprises a pH reducing agent.

5. The method of claim 1, wherein the treatment fluid comprises a hydrophobically modified alkali swellable emulsion.

6. The method of claim 1, wherein a spacer fluid is pumped into the well prior to the treatment fluid.

7. A method of controlling lost circulation during drilling in a subterranean well, comprising:
   i. pumping a treatment fluid comprising from 5 wt % to 60 wt % of at least one polymer containing at least one carboxylate functional group down the well;
   ii. allowing the treatment fluid to enter voids in a subterranean formation containing carbonate minerals; and
   iii. reacting the treatment fluid with the carbonate minerals and associated divalent cations, thereby forming a plug, characterized in that the reaction to form the plug does not require the presence of a crosslinking agent.

8. The method of claim 7, wherein the treatment fluid is pumped into the well through the interior of one or more tubulars chosen from the group consisting of drill pipe, coiled tubing and casing.

9. The method of claim 8, wherein the treatment fluid is pumped into the well through an annulus between the tubulars and the subterranean formation.

10. The method of claim 7, wherein the treatment fluid further comprises a pH reducing agent.

11. The method of claim 7, wherein the treatment fluid comprises a hydrophobically modified alkali swellable emulsion.

12. The method of claim 7, wherein a spacer fluid is pumped into the well prior to the treatment fluid.

13. The method of claim 7, wherein the treatment fluid further comprises one or more lost-circulation materials chosen from the group consisting of granular particles, lamellar particles and fibers.

14. A method for lost circulation treatment during drilling comprising:

i. pumping a treatment fluid comprising from 5 wt % to 60 wt % of at least one polymer with carboxylate functional groups down the well;

ii. allowing the treatment fluid to enter voids in a subterranean formation containing carbonate minerals; and iii. reacting the treatment fluid with the carbonate minerals and associated divalent cations, thereby forming a plug.

15. The method of claim 14, wherein the treatment fluid comprises a hydrophobically modified alkali swellable emulsion.

16. The method of claim 14, wherein the treatment fluid is a spacer.

17. The method of claim 14, wherein the polymer with carboxylate functional groups is present in the treatment fluid at a concentration between 5 wt % to 50 wt %.

18. The method of claim 17, wherein the polymer with carboxylate functional groups is present in the treatment fluid at a concentration between 20 wt % to 50 wt %.

19. The method of claim 14, wherein the treatment fluid has a pH lower than or equal to 7.

20. The method of claim 19, wherein the treatment fluid has a pH lower than or equal to 5.

\* \* \* \* \*